US007005115B2

(12) United States Patent
Harada et al.

(10) Patent No.: US 7,005,115 B2
(45) Date of Patent: Feb. 28, 2006

(54) GAS COMBUSTION TREATMENT METHOD AND APPARATUS THEREFOR

(75) Inventors: Masahiro Harada, Tokyo (JP); Makoto Susaki, Tokyo (JP); Kazuo Ishida, Tokyo (JP); Hajime Nagano, Tokyo (JP); Masahiro Hirano, Tokyo (JP); Hiroshi Suzumura, Hiroshima (JP); Shintaro Honjo, Hiroshima (JP); Yoshinori Koyama, Nagasaki (JP); Katsuhiko Yokohama, Nagasaki (JP); Mitsugi Suehiro, Tama (JP)

(73) Assignees: Mitsubishi Heavy Industries, Ltd., Tokyo (JP); Ryoen Technical Service Corp., Tokyo (JP)

( * ) Notice: Subject to any disclaimer, the term of this patent is extended or adjusted under 35 U.S.C. 154(b) by 512 days.

(21) Appl. No.: 10/245,326

(22) Filed: Sep. 18, 2002

(65) Prior Publication Data

US 2003/0108831 A1 Jun. 12, 2003

(30) Foreign Application Priority Data

Oct. 26, 2001 (JP) ............................ 2001-329190

(51) Int. Cl.
*C01B 17/16* (2006.01)
*C01B 31/20* (2006.01)
*C01B 21/00* (2006.01)

(52) U.S. Cl. ....................... 423/225; 423/234; 423/235

(58) Field of Classification Search ..................... None
See application file for complete search history.

(56) References Cited

U.S. PATENT DOCUMENTS 3,970,743 A * 7/1976 Beavon .................. 423/574.1
4,035,158 A * 7/1977 Scott et al. ................. 422/160
4,038,036 A * 7/1977 Beavon ..................... 422/189
4,394,119 A * 7/1983 Waller et al. .................. 431/5
4,596,699 A * 6/1986 Desgrandchamps et al. ......................... 422/160
4,780,305 A 10/1988 Steppe
4,988,287 A * 1/1991 Stegelman et al. ......... 431/284
5,139,764 A 8/1992 Szekely
5,508,013 A * 4/1996 Kvasnikoff et al. ......... 423/220
5,904,910 A * 5/1999 Stevens et al. .......... 423/574.1
6,780,392 B1 * 8/2004 Gross et al. ............ 423/576.8
6,902,713 B1 * 6/2005 Binoist et al. ............. 423/237

FOREIGN PATENT DOCUMENTS

EP 1306617 A2 * 5/2003
GB 2 116 531 9/1983
JP 10-185159 7/1998
JP 2000-290668 10/2000

* cited by examiner

*Primary Examiner*—Colleen P. Cooke
(74) *Attorney, Agent, or Firm*—Oblon, Spivak, McClelland, Maier & Neustadt, P.C.

(57) ABSTRACT

A gas combustion treatment method for the combustion treatment of an ammonia-containing gas and a hydrogen sulfide-containing gas, the method comprising a first combustion treatment step in which the ammonia-containing gas, together with a fuel, is introduced and burned; a nitrogen oxide reduction step downstream of the first combustion treatment step, in which a portion of the hydrogen sulfide-containing gas or the ammonia-containing gas is introduced and the nitrogen oxides produced in the first combustion treatment step are reduced in a reducing atmosphere; and a second combustion treatment step downstream of the nitrogen oxide reduction step, in which the remaining hydrogen sulfide-containing gas, together with air, is introduced and burned. The present invention provides a combustion apparatus suitable for use as a combustion furnace for off-gases resulting from the wet purification of coal gasification gas.

6 Claims, 2 Drawing Sheets

GAS COMBUSTION TREATMENT METHOD AND APPARATUS THEREFOR

FIELD OF THE INVENTION

This invention relates to gas combustion treatment methods and gas combustion apparatus. More particularly, it relates to a combustion apparatus suitable for use as a combustion furnace for off-gases resulting from the wet purification of coal gasification gas, and a combustion method therefor.

BACKGROUND OF THE INVENTION

When coal is gasified and used as a fuel for electric power generation, sulfur compounds (e.g., hydrogen sulfide and carbonyl sulfide) and nitrogen compounds such as ammonia are contained in the product gas. From the viewpoint of environmental protection and corrosion prevention, these compounds are removed in wet purification equipment. The hydrogen sulfide ($H_2S$) removed in the wet purification equipment is stripped off and discharged as an off-gas containing hydrogen oxide at a high concentration (i.e., $H_2S$ off-gas). Moreover, the recovered ammonia ($NH_3$) is similarly stripped off and discharged as an off-gas containing ammonia (i.e., $NH_3$ off-gas). This system is more specifically described below with reference to a flow diagram shown in FIG. 3.

Referring to the flow diagram shown in FIG. 3, hydrogen sulfide present in the product gas is removed with the aid of an amine in the $H_2S$ removal step, and the hydrogen sulfide is released again from the amine. In order to effect the combustion treatment of the resulting regeneration gas containing hydrogen sulfide, the $H_2S$ off-gas has been treated in a common combustion furnace, storage type combustion furnace or the like. As the combustion apparatus used in this combustion step, a storage type combustion furnace has conventionally been chosen and used because, when hydrogen sulfide is burned therein, the amount of $SO_3$ formed as a by-product is small.

However, storage type combustion furnaces have problems in that they require a valve mechanism for carrying out operation while changing a plurality of flow paths in order to maintain the effectiveness of heat exchange and its operating procedure is troublesome. Moreover, they are disadvantageous from the viewpoint of reliability ensuring freedom from troubles such as failure. That is, since heat exchange is effected when a gas flows through heat reservoirs, it may happen that the temperature of one heat reservoir continues to rise while the temperature of another continues to drop. Accordingly, it has been required to carry out operation while switching a plurality of valves constantly so as to change the gas inlets and outlets for heat reservoirs properly.

On the other hand, when conventional storage type combustion furnaces (at 1,000° C.) are used for the combustion treatment of $NH_3$ off-gas, the complete combustion treatment of $NH_3$ cannot be achieved to cause a leak of $NH_3$ to the downstream side. Although a high combustion temperature (about 1,500° C.) is required to decompose $NH_3$ completely, the operating temperature of storage type combustion furnaces has been limited to about 1,000° C. owing, for example, to the endurable temperature limits of heat reservoirs comprising mullite and cordierite (high-temperature ceramic materials).

Also from the viewpoint of nitrogen oxide (NOx) reduction, it is necessary to burn $NH_3$ off-gas at a high temperature (about 1,500° C.), because the denitrification reaction of NO (formed from a portion of $NH_3$) with $NH_3$ is pronounced at 1,300° C. or above. On the other hand, the NOx produced in the combustion step includes fuel NOx formed from nitrogen-containing fuels such as ammonia, and thermal NOx formed from atmospheric nitrogen in high-temperature regions (e.g., flames). Since the rate of formation of thermal NOx is enhanced in higher-temperature regions, the amount of thermal NOx produced is increased at high temperatures. However, when a large amount of an ammonia-containing gas is to be treated continuously, it is necessary to use a temperature capable of decomposing $NH_3$ completely. That is, it has been desired to develop a technique for the treatment of an ammonia-containing gas in which $NH_3$ is treated at a temperature capable of decomposing it completely and the amount of NOx produced can be reduced.

On the other hand, a direct-burning type combustion apparatus can treat hydrogen sulfide and ammonia at very high temperatures by burning a fuel in a burner section and feeding hydrogen sulfide and ammonia thereto. In connection with this combustion apparatus, a single-stage technique for controlling, for example, the amount of oxygen introduced and thereby burning ammonia under a reducing atmosphere, for example, at a temperature in the vicinity of 1,000 to 1,200° C. has been proposed as a technique for minimizing the amount of NOx produced by the combustion of ammonia.

However, in order to maintain a high temperature of about 1,000° C. or above under a reducing atmosphere, it is necessary to burn a large amount of additional fuel. Moreover, a large-sized combustion apparatus adapted for high-temperature conditions is required, and this is not economical from the viewpoint of operation and equipment investment. Furthermore, in order to solve the above-described problems associated with storage type combustion furnaces and thereby achieve a satisfactory reduction of NOx, it is desirable to burn and decompose ammonia at a high temperature of at least 1,300° C. or above, rather than a temperature in the vicinity of 1,000° C.

When a direct-burning type combustion apparatus is used to burn and decompose ammonia at high temperatures, NOx is produced as a result of high-temperature treatment. Consequently, a suitable measure to reduce NOx with the aid of a reducing agent (e.g., $NH_3$, $H_2S$ or CO) or the like is required.

SUMMARY OF THE INVENTION

In view of the above-described problems, the present inventors made intensive investigations for the purpose of developing a method for the treatment of an ammonia-containing gas and a hydrogen sulfide-containing gas in which these off-gases can be treated at a reduced running cost, the emission of nitrogen oxides (NOx) and the like can be effectively suppressed so as to be lower than required environmental load levels, and the apparatus used therefor is simple and small-sized, has high reliability, and is easy of operation and maintenance.

As a result, the present inventors have now found that these problems can be solved by providing a nitrogen oxide reduction step between the ammonia combustion step and the hydrogen sulfide combustion step and by feeding ammonia gas or hydrogen sulfide gas to the combustion apparatus in two divided portions. The present invention has been completed from this point of view.

That is, the present invention provides a gas combustion treatment method for the combustion treatment of an ammonia-containing gas and a hydrogen sulfide-containing gas, the method comprising a first combustion treatment step in which a fuel and the ammonia-containing gas are introduced and burned; a nitrogen oxide reduction step downstream of the first combustion treatment step, in which a reducing agent (e.g., a portion of the ammonia-containing gas or the hydrogen sulfide-containing gas) is introduced and the nitrogen oxides produced in the first combustion treatment step are reduced under a reducing atmosphere; and a second combustion treatment step downstream of the nitrogen oxide reduction step, in which the hydrogen sulfide-containing gas, together with air, is introduced and burned. In the aforesaid first combustion treatment step, it is preferable to carry out the combustion treatment under an oxidizing atmosphere at 1,300° C. or above. Moreover, in the nitrogen oxide reduction step, it is preferable to introduce a portion of the ammonia-containing gas and reduce the nitrogen oxides produced in the first combustion treatment step under a reducing atmosphere.

In the first combustion treatment step, it is preferable to measure the outlet gas temperature and control the flow rate of the fuel is controlled so that the outlet gas temperature will be not less than a predetermined temperature. Moreover, in the nitrogen oxide reduction step or the second combustion treatment step, it is preferable to measure the outlet nitrogen oxide concentration and control the flow rate of the ammonia-containing gas or hydrogen sulfide-containing gas introduced into the nitrogen oxide reduction step is controlled so that outlet nitrogen oxide concentration will be not greater than a predetermined concentration.

The present invention also provides a gas combustion apparatus for the combustion treatment of an ammonia-containing gas and a hydrogen sulfide-containing gas, the apparatus comprising a first combustion section in which the ammonia-containing gas, together with a fuel, is introduced and burned; a nitrogen oxide reduction section located downstream of the first combustion section, in which a portion of the hydrogen sulfide-containing gas is introduced and the nitrogen oxides transferred from the first combustion section are reduced under a reducing atmosphere; and a second combustion section located downstream of the nitrogen oxide reduction section, in which the remaining hydrogen sulfide-containing gas, together with air, is introduced and burned. It is desirable that the gas combustion apparatus has a structure in which the cross section of the gas flow path extending from the first combustion section to the nitrogen oxide reduction section is made smaller than the cross sections of the first combustion section and the nitrogen oxide reduction section and in which a radiation shield is provided between the nitrogen oxide reduction section and the second combustion section.

The present invention can provide a three-stage combustion apparatus in which the combustion treatment of off-gases resulting from the purification of coal gasification gas can be carried out very efficiently.

In a system using the combustion apparatus of the present invention, $NH_3$ off-gas and $H_2S$ off-gas are subjected to combustion treatment in the same combustion apparatus. When $NH_3$ off-gas is burned in a high temperature range (about 1,500–1,600° C.), the production of NOx is suppressed to a low level. Accordingly, at the initial stage of the combustion apparatus of the present invention, $NH_3$ off-gas is first subjected to perfect combustion treatment under an oxidizing atmosphere and thereby converted into nitrogen and water. Since $H_2S$ off-gas can be treated in a low temperature range (800° C. or above), $H_2S$ off-gas is subjected to combustion treatment under an oxidizing atmosphere and thereby converted into water ($H_2O$) and sulfur dioxide ($SO_2$) after the combustion treatment of $NH_3$ off-gas.

Since the combustion treatment of ammonia ($NH_3$) produces some nitrogen oxides (NOx), a portion of the $H_2S$ off-gas or $NH_3$ off-gas is by-passed and introduced in the presence of NOx immediately after the combustion of ammonia. Thus, at the second stage comprising a nitrogen oxide reduction step, NOx is reduced to $N_2$ under a reducing atmosphere, resulting in a reduced NOx concentration.

The three-stage combustion apparatus of the present invention is divided into three stages. Starting from its upstream end for gas introduction, the first stage comprises a first combustion section for burning $NH_3$ off-gas, the second stage comprises a nitrogen oxide reduction section for reducing NOx, and the third stage comprises a second combustion section for burning $H_2S$ off-gas. This three-stage construction makes it possible to carry out the combustion treatment of $NH_3$ off-gas and $H_2S$ off-gas in the same combustion apparatus while giving low environmental load values.

Since the present invention enables the sequential combustion treatment of $NH_3$ off-gas and $H_2S$ off-gas, the necessity of treating them separately is eliminated to bring about a simplification of the treatment system. Moreover, by burning $NH_3$ off-gas, the cost for the disposal of ammonia water is made unnecessary. Furthermore, by providing a bypass section for $H_2S$ off-gas or $NH_3$ off-gas, the production of NOx is reduced. In addition, the effect of heat recovery from combustion furnace waste gas can be expected.

Figure 1:
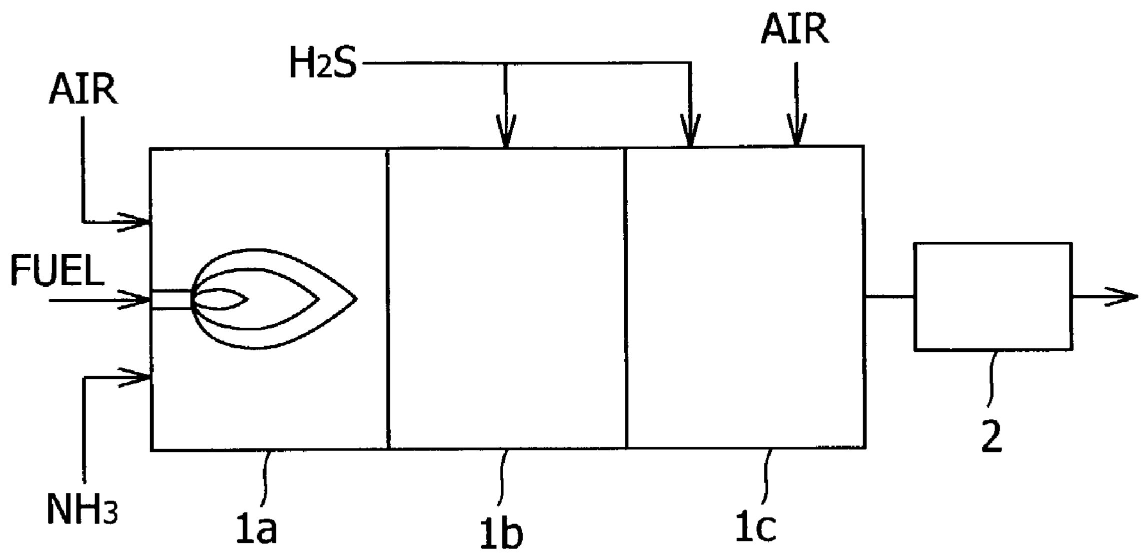
FIG. 1 is a schematic view illustrating the general construction of the combustion apparatus of the present invention.

The reference numerals shown in these figures are defined as follows: 1, Combustion apparatus; 1*a* First combustion section; 1*b* Nitrogen oxide reduction section; 1*c* Second combustion section; 2 WHB(waste heat boiler); 3 Narrowed part; 4 Partition; 10 GT(gas turbine); 11 GGH(heat exchanger); 12 Stack.

DETAILED DESCRIPTION OF THE INVENTION

Specific embodiments of the gas combustion method in accordance with the present invention will be described below with reference to the accompanying drawings.

FIG. 1 is a schematic view illustrating an example of a combustion apparatus suitable for carrying out the combustion treatment method of the present invention. When viewed from its upstream end at which ammonia and a fuel are introduced, the combustion apparatus of this embodiment is equipped with a first combustion section 1*a*, a nitrogen oxide reduction section 1*b* and a second combustion section 1*c* in that order. In first combustion section 1*a*, an ammonia ($NH_3$)-containing gas is introduced together with a fuel. Since this combustion apparatus is of a direct-burning type, a fuel is introduced in order to cause combustion in the combustion furnace, and this fuel is usually injected through a nozzle. At the same time, an oxygen-containing gas comprising air or the like is introduced in order to burn the fuel and ammonia in first combustion section 1*a*. If $NH_3$ off-gas is subjected to combustion treatment in a high temperature range (about 1500–1600° C.), the production of NOx from ammonia can be suppressed to a low level. Accordingly, in the combustion apparatus of the present invention, $NH_3$ off-gas is first introduced into first combustion section 1*a* constituting its previous stage and decomposed to nitrogen and water by complete combustion treatment in an oxidizing atmosphere.

The ammonia fed to this step is introduced in the form of ammonia gas. For example, when the present invention is applied to a system for the purification of coal gasification gas, an ammonia-containing gas recovered in a stripper is introduced into first combustion section 1*a* in its gaseous form, without being condensed.

Ammonia is introduced into first combustion section 1*a* of the combustion apparatus, where it is exposed to a high temperature of about 1500 to 1600° C. and decomposed to $N_2$ and $H_2O$ by complete combustion treatment. In this first combustion treatment step for ammonia, the production of NOx can be suppressed to some extent by combustion treatment at a very high temperature. However, the production of thermal NOx cannot be entirely avoided.

In the combustion apparatus of the present invention, therefore, a hydrogen sulfide-containing gas or the ammonia-containing gas is divided into two portions. A portion thereof is introduced into nitrogen oxide reduction section 1*b* of the combustion apparatus, and the remaining hydrogen sulfide gas is introduced into second combustion section 1*c* of the combustion apparatus. Hydrogen sulfide is a component which can be sufficiently burned at about 800° C., and it is unnecessary to use a high temperature up to 1,500° C.

The gas resulting from combustion in first combustion section 1*a* is directly transferred to nitrogen oxide reduction section 1*b* located on the downstream side thereof. In nitrogen oxide reduction section 1*b*, a portion of the hydrogen sulfide-containing gas or the ammonia-containing gas is introduced so that the nitrogen oxides transferred from first combustion section 1*a* may be reduced under a reducing atmosphere. Since the combustion treatment of ammonia ($NH_3$) in the first combustion section produces nitrogen oxides (NOx), a portion of the $H_2S$ gas before being burned, or a portion of the ammonia-containing gas, is introduced in the presence of NOx immediately after the combustion of ammonia. Thus, NOx is reduced to $N_2$ under a reducing atmosphere comprising $H_2S$ gas or $NH_3$ gas, resulting in a decrease of NOx present in the gas.

That is, a reducing atmosphere is created in nitrogen oxide reduction section 1*b* into which a portion of the hydrogen sulfide-containing gas or the ammonia-containing gas is introduced. In first combustion section 1*a*, an additional fuel needs to be introduced and burned, so that an oxidizing atmosphere is present therein. However, in nitrogen oxide reduction section 1*b*, NOx is reduced to $N_2$ under a reducing atmosphere produced by the introduction of hydrogen sulfide or ammonia. As the amount of hydrogen sulfide-containing gas or ammonia-containing gas introduced, at least an amount required to create a reducing atmosphere in nitrogen oxide reduction section 1*b* will suffice. Specifically, at least an equivalent amount to the oxygen present therein is introduced.

In first combustion section 1*a*, it is desirable to minimize excess oxygen so as to suppress the production of NOx. On the other hand, it is necessary to add oxygen somewhat in excess so as to effect perfect combustion. Accordingly, the actual operating conditions should preferably be such that the amount of excess oxygen present in the gas flowing from first combustion section 1*a* to nitrogen oxide reduction section 1*b* is controlled so as to be usually in the range of about 0.1 to 3 mole % and more specifically about 0.5 to 1 mole %. This makes it easy to control the amount of hydrogen sulfide-containing gas or ammonia-containing gas introduced in order to convert the atmosphere of nitrogen oxide reduction section 1*b* into a reducing atmosphere. Thus, all of the remaining hydrogen sulfide can be introduced into second combustion section 1*c*.

No particular limitation is placed on the ratio between the hydrogen sulfide-containing gas fractions introduced into nitrogen oxide reduction section 1*b* and second combustion section 1*c*, because it depends, for example, on the properties and contents of the gas to be treated, and may hence be determined arbitrarily. For example, in the hydrogen sulfide treatment of coal gasification gas, a preferred embodiment is usually such that 5 to 20% of the hydrogen sulfide-containing gas is introduced into nitrogen oxide reduction section 1*b* and 80 to 95% thereof into second combustion section 1*c*. Similarly to hydrogen sulfide, no particular limitation is placed on the ratio between the ammonia-containing gas fractions introduced into first combustion section 1*a* and nitrogen oxide reduction section 1*b*. For example, a preferred embodiment is such that 80 to 99% of the ammonia-containing gas is introduced into first combustion section 1*a* and 1 to 20% thereof into nitrogen oxide reduction section 1*b*. It is unnecessary to introduce a fuel into the aforesaid nitrogen oxide reduction section 1*b*. Since this section usually has a temperature of about 1,400 to 1,500° C., hydrogen sulfide burns by itself and ammonia also decomposes.

Then, the gas having a reduced NOx concentration is transferred to second combustion section 1*c* located on the downstream side thereof. In this second combustion section 1*c*, the remaining hydrogen sulfide-containing gas, together with air, is introduced and burned. Since $H_2S$ gas can be treated in a low-temperature range (800° C. or above), $H_2S$ gas is burned under an oxidizing atmosphere and thereby converted into water ($H_2O$) and sulfur dioxide ($SO_2$), after the combustion treatment of $NH_3$ gas.

Second combustion section 1*c* usually has a temperature of about 800 to 900° C. and hydrogen sulfide usually burns therein by itself. Hydrogen sulfide is a substance which burns easily at a certain temperature or above even if its concentration is low, and it burns at 800 C. or above by itself. Accordingly, when $H_2S$ gas is mixed with the gas transferred from nitrogen oxide reduction section 1*b* and having a temperature of 1,000° C. or above, it burns by using the gas as a heat source. Since the introduced $H_2S$ gas has a high $H_2S$ content and a high calorific value, no fuel is usually needed for purposes of combustion. However, a fuel may be added as required.

Figure 2:
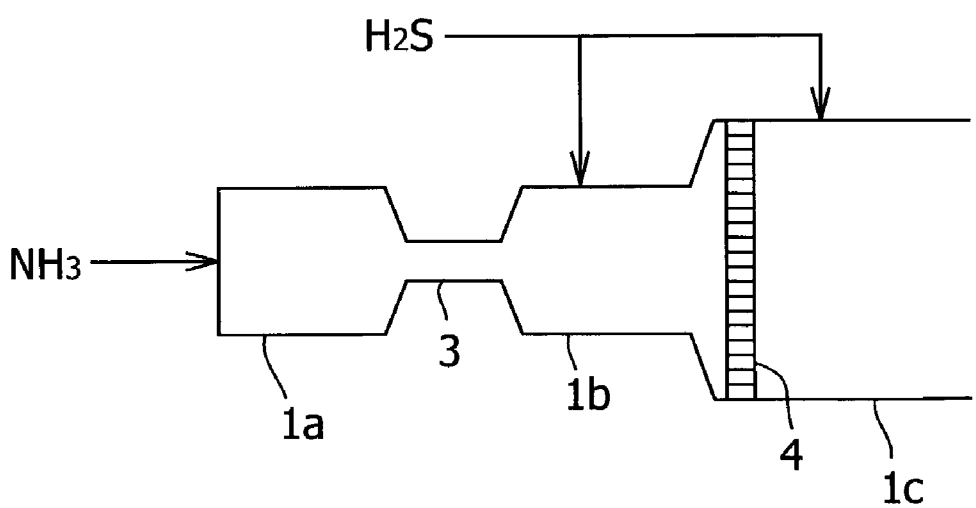
FIG. 2 is a schematic view illustrating an exemplary construction of the combustion apparatus of the present invention.

By using the above-described treatment apparatus of the present invention, the combustion treatment of an ammonia-containing gas and a hydrogen sulfide-containing gas can be carried out very efficiently. A more specific embodiment of the apparatus is illustrated in FIG. 2, though the construction thereof is not limited thereby. In this embodiment, reference numeral 3 designates a narrowed part where the gas flowing therethrough can be easily mixed. Reference numeral 4 designates a partition formed of a high-temperature ceramic material or the like and serving for radiation shielding purposes (i.e., a radiation shield such as a perforated plate).

This radiation shield is used to create a temperature difference between nitrogen oxide reduction section 1*b* and second combustion section 1*c*.

Since exhaust gas having a temperature of about 900 C. is discharged from the combustion apparatus of the present invention, heat can be recovered by installing a WHB 2 on the downstream side of the combustion furnace.

As compared with a storage type combustion furnace, a direct-burning type combustion furnace produces a larger amount of $SO_3$ as a result of the combustion of $H_2S$. Since $SO_3$ forming dust cannot be satisfactorily removed in an exhaust gas desulfurizer (not shown) installed downstream thereof, the use of a direct-burning type combustion furnace makes it necessary to install $SO_3$ removal equipment on the downstream side of the combustion furnace.

Specifically, the exhaust gas resulting from the direct-burning type combustion furnace undergoes heat recovery in WHB 2 until it is cooled to about 300° C., and then passed through a wet cooling tower where $SO_3$ is brought into contact with water and recovered as sulfuric acid. $SO_3$ dissolves in water almost completely. A sulfuric acid mist is produced in this cooling tower, but it cannot be satisfactorily removed in the exhaust gas desulfurizer. Accordingly, a wet EP (not shown) is installed downstream of the combustion furnace to precipitate the sulfuric acid mist electrostatically. Such a process causes a significant reduction in environmental loads.

No particular limitation is placed on the gas treated according to the present invention, and a wide variety of gases containing ammonia and hydrogen sulfide can be treated. One specific example thereof is coal gasification gas containing large amounts of ammonia and hydrogen sulfide.

In a system for gasifying coal and using the resulting gas as a fuel for electric power generation, the combustion apparatus of the present invention may be used as a part of the system by installing it on the downstream side of the step of removing hydrogen sulfide with an amine and utilizing it as a combustion furnace for off-gases resulting from the wet purification of coal gasification gas. In such a system where it is required to an ammonia-containing gas and a hydrogen sulfide-containing gas at the same time, the treatment of both off-gases can be very efficiently promoted by using the above-described combustion apparatus of the present invention.

Figure 3:
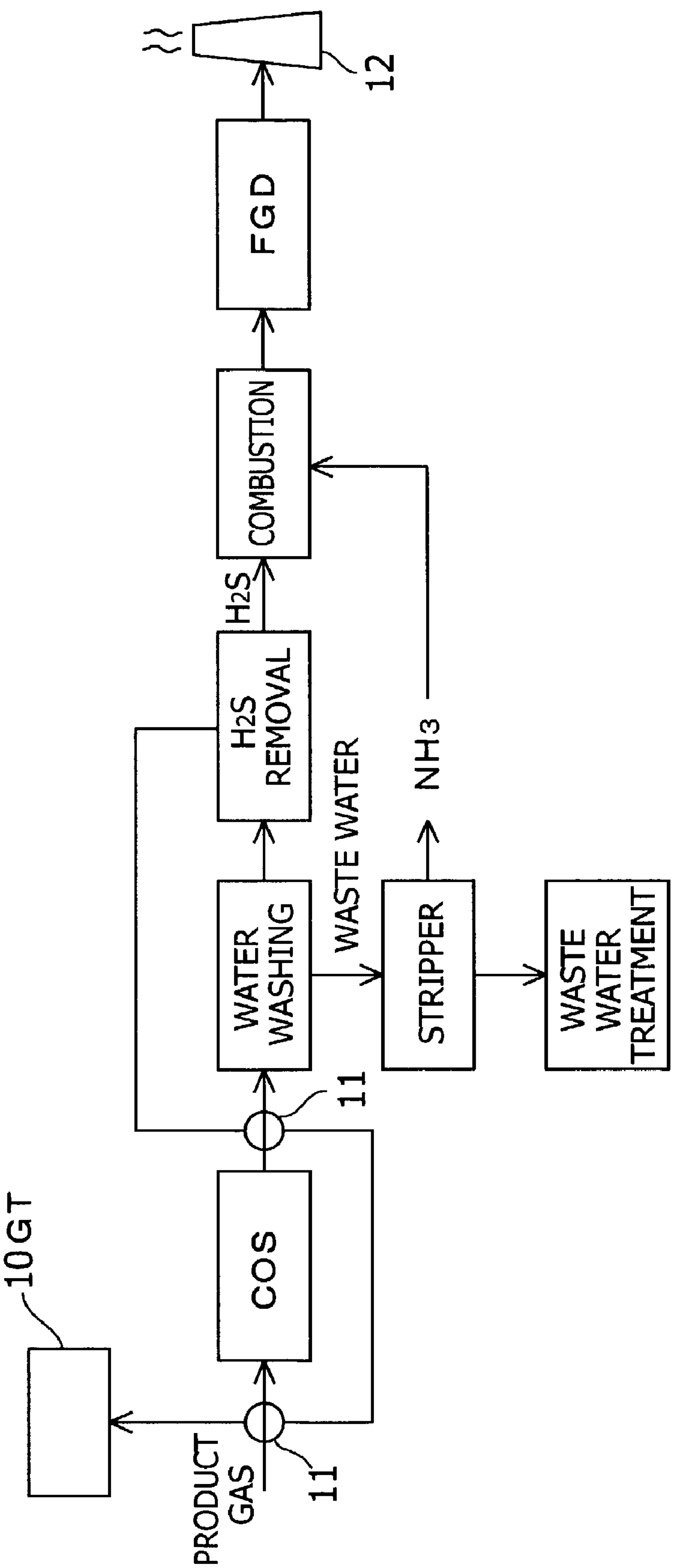
FIG. 3 is a schematic view illustrating an exemplary system in which the combustion apparatus of the present invention can suitably be used.

Specifically, the above-described combustion apparatus may suitably be used in the combustion step of a purification system illustrated in FIG. 3. In this case, ammonia gas obtained by stripping waste water separated in the water washing step is used as the ammonia-containing gas. This makes it unnecessary to supply ammonia as a reducing agent from an external source to the combustion apparatus and to dispose of ammonia. Consequently, a large-sized apparatus for preparing 100% ammonia under high-temperature and high-pressure conditions and associated equipment are not needed, so that the treatment system can be reduced in size and simplified. In the system of FIG. 3, essentially all ammonia is incorporated into waste water, so that the gas flowing from the water washing step to the hydrogen sulfide removal step is substantially free of ammonia. When the gas before the water washing step contains about 1,000 ppm of ammonia, the ammonia content in the gas after the water washing step is reduced to 10 ppm or less. Although the installation of a COS conversion step (i.e., a step for converting COS into $H_2S$) is not essential, it may be installed, for example, on the upstream side of the water washing step as illustrated in FIG. 3.

Since the treatment method of the present invention enables the combustion treatment of $NH_3$ off-gas and $H_2S$ off-gas in a single sequence, the necessity of treating them separately is eliminated to bring about a simplification of the treatment system. Moreover, the emission of nitrogen oxides (NOx), which has been a problem involved in the treatment of an ammonia-containing gas, can be effectively suppressed. Furthermore, the apparatus used therefor is simple and small-sized, has high reliability, and is easy of operation and maintenance. In addition, by burning $NH_3$ off-gas, a reduction in running costs can be achieved, for example, because the cost for the disposal of ammonia water is made unnecessary.

What is claimed is:

1. A gas combustion treatment method for the combustion treatment of an ammonia-containing gas and a hydrogen sulfide-containing gas, said method comprising:

a first combustion treatment step in which a fuel and the ammonia-containing gas are introduced and burned;

a nitrogen oxide reduction step downstream of the first combustion treatment step, in which a reducing agent is introduced and the nitrogen oxides produced in the first combustion treatment step are reduced under a reducing atmosphere; and a second combustion treatment step downstream of the nitrogen oxide reduction step, in which the remaining hydrogen sulfide-containing gas, together with air, is introduced and burned.

2. A gas combustion treatment method as claimed in claim 1 wherein the reducing agent comprises a portion of the ammonia-containing gas or the hydrogen sulfide-containing gas.

3. A gas combustion treatment method as claimed in claim 1 or 2 wherein, in the first combustion treatment step, the combustion treatment is carried out under an oxidizing atmosphere at 1,300° C. or above.

4. A gas combustion treatment method as claimed in claim 1 wherein, in the nitrogen oxide reduction step, a portion of the ammonia-containing gas is introduced and the nitrogen oxides produced in the first combustion treatment step are reduced under a reducing atmosphere.

5. A gas combustion treatment method as claimed in claim 1 wherein, in the first combustion treatment step, the outlet gas temperature is measured and the flow rate of the fuel is controlled so that the outlet gas temperature will be not less than a predetermined temperature.

6. A gas combustion treatment method as claimed in claim 1 wherein, in the nitrogen oxide reduction step or the second combustion treatment step, the outlet nitrogen oxide concentration is measured and the flow rate of the ammonia-containing gas or hydrogen sulfide-containing gas introduced into the nitrogen oxide reduction step is controlled so that outlet nitrogen oxide concentration will be not greater than a predetermined concentration.

* * * * *